(12) United States Patent
Fujita et al.

(10) Patent No.: US 7,416,808 B2
(45) Date of Patent: Aug. 26, 2008

(54) FUEL CELL APPARATUS INCLUDING MANIFOLDS THEREIN

(75) Inventors: Goro Fujita, Ota (JP); Hiroki Kabumoto, Saitama (JP); Masaya Yano, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/937,352

(22) Filed: Sep. 10, 2004

(65) Prior Publication Data

US 2005/0058880 A1 Mar. 17, 2005

(30) Foreign Application Priority Data

Sep. 12, 2003 (JP) ............................. 2003-322301
Jul. 22, 2004 (JP) ............................. 2004-214006

(51) Int. Cl.
*H01M 2/14* (2006.01)
(52) U.S. Cl. .............................. 429/38; 429/34; 429/39
(58) Field of Classification Search .................. 429/34, 429/39, 88
See application file for complete search history.

(56) References Cited

U.S. PATENT DOCUMENTS

| 6,866,950 B2* | 3/2005 | Connor et al. ................ 429/13 |
| 6,875,535 B2* | 4/2005 | Ye et al. ........................ 429/39 |
| 2003/0003336 A1* | 1/2003 | Colbow et al. ................ 429/24 |
| 2003/0031908 A1 | 2/2003 | Bostaph et al. |
| 2003/0186093 A1* | 10/2003 | St-Pierre et al. ............... 429/13 |
| 2003/0215686 A1* | 11/2003 | DeFilippis et al. ............ 429/34 |
| 2004/0028961 A1* | 2/2004 | Acker .......................... 429/13 |

FOREIGN PATENT DOCUMENTS

| JP | 40-015707 U | 6/1965 |
| JP | 59-075327 | 4/1984 |
| JP | 61-161962 U | 10/1986 |
| JP | 62-056613 | 3/1987 |
| JP | 4-223058 | 8/1992 |
| JP | 4-333958 | 11/1992 |
| JP | 5-71944 | 9/1993 |
| JP | 2000-132775 | 5/2000 |
| JP | 2000-207063 | 7/2000 |
| JP | 2001-006717 | 1/2001 |
| JP | 2001-068138 | 3/2001 |

(Continued)

OTHER PUBLICATIONS

Japanese Office Action with English Translation issued in corresponding Japanese Patent Application No. 2004-214004 dated Oct. 3, 2006.

(Continued)

*Primary Examiner*—Patrick Ryan
*Assistant Examiner*—Ben Lewis
(74) *Attorney, Agent, or Firm*—McDermott Will & Emery LLP

(57) ABSTRACT

A fuel cell apparatus which runs on liquid fuel includes a first inlet manifold which is a way to supply air to the anode of the fuel cell apparatus, a second inlet manifold which is a way to supply the liquid fuel to the cathode of the fuel cell apparatus, an outlet manifold which is a way in which fluid discharged from the anode and the cathode flows.

2 Claims, 18 Drawing Sheets

FOREIGN PATENT DOCUMENTS

| | | |
|---|---|---|
| JP | 2001-093551 | 4/2001 |
| JP | 2002-032154 | 1/2002 |
| JP | 2002-049440 | 2/2002 |
| JP | 2002-169629 | 6/2002 |
| JP | 2002-216832 | 8/2002 |
| JP | 2002-319418 | 10/2002 |
| JP | 2002-362470 A | 12/2002 |
| JP | 2003-045468 | 2/2003 |
| JP | 2003-132924 | 5/2003 |
| JP | 2003-142135 | 5/2003 |
| JP | 2003-203660 | 7/2003 |
| JP | 2003-217618 | 7/2003 |
| JP | 2003-223243 | 8/2003 |
| JP | 2003-257462 | 9/2003 |
| JP | 2003-347759 | 12/2003 |
| JP | 2004-142831 | 5/2004 |
| JP | 2004-265835 A | 9/2004 |

OTHER PUBLICATIONS

Japanese Office Action with English Translation issued in corresponding Japanese Patent Application No. 2004-214004 dated May 29, 2007.

Japanese Office Action with English Translation issued in corresponding Japanese Patent Application No. 2004-214003 dated May 1, 2007.

Japanese Office Action with English Translation issued in corresponding Japanese Patent Application No. 2004-214003 dated Sep. 28, 2006.

Japanese Office Action dated Oct. 17, 2006 with English translation.
Japanese Office Action dated Oct. 10, 2006 with English translation.
Japanese Office Action dated Apr. 17, 2007 with English translation.

* cited by examiner

FIG.6A
FIG.6B
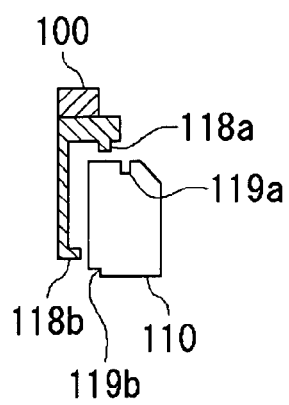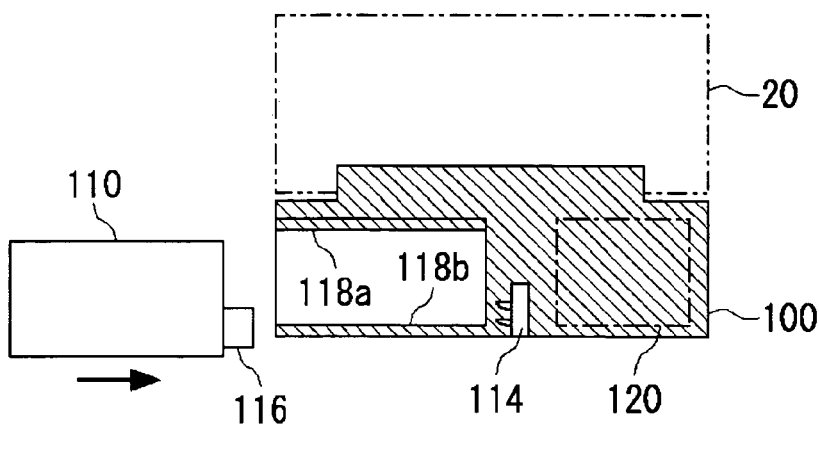

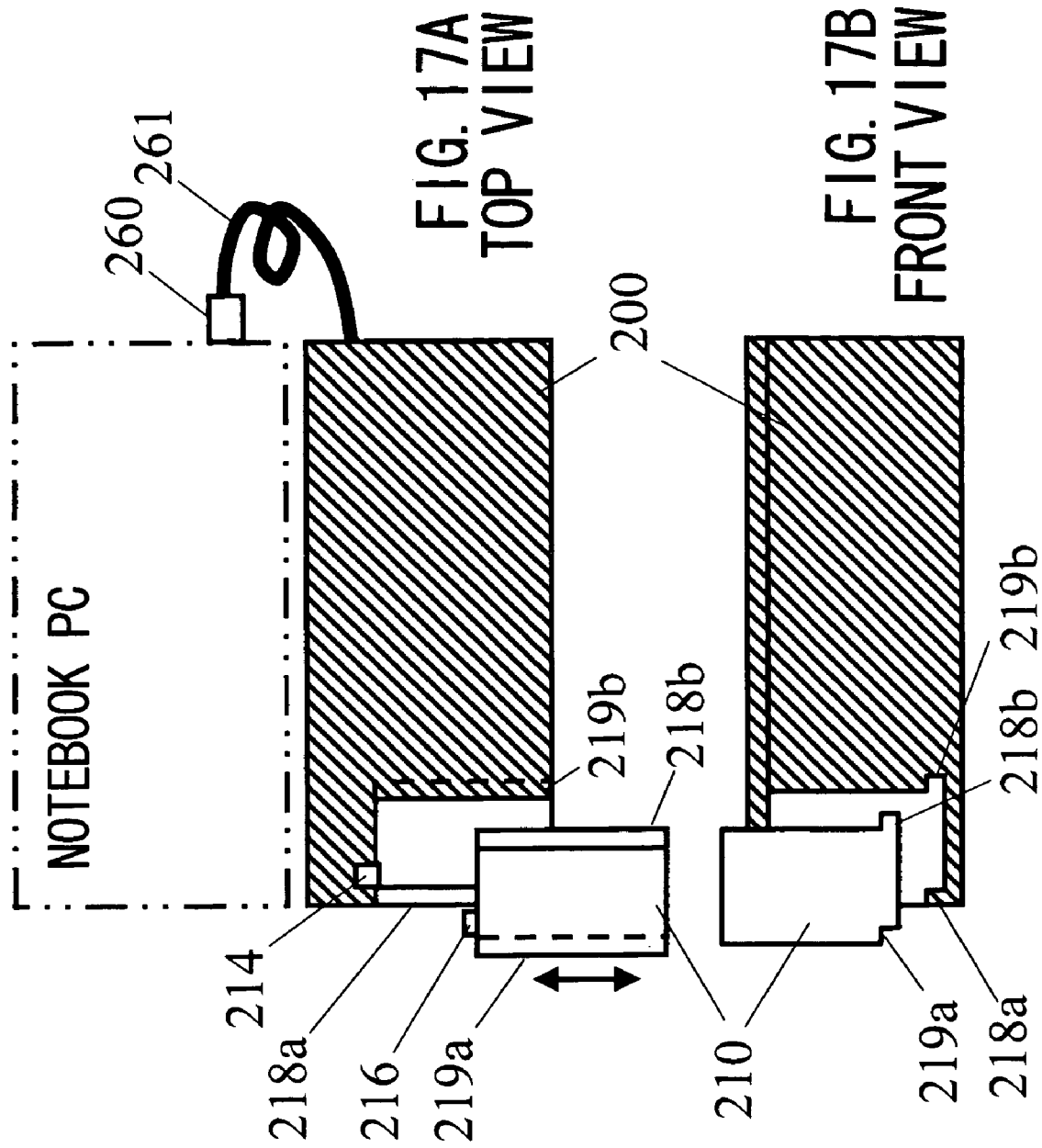

FUEL CELL APPARATUS INCLUDING MANIFOLDS THEREIN

BACKGROUND OF THE INVENTION

1. Field of the Invention

The present invention relates to fuel cell apparatus, and it particularly relates to a fuel cell apparatus which runs on liquid fuel.

2. Description of the Related Art

In recent years, much attention has been focused on the direct methanol fuel cell (hereinafter referred to as "DMFC") as a form of fuel cell. With a DMFC, methanol, which is the fuel therefor, is directly supplied to the negative electrode without having it reformed, and electric power is produced by an electrochemical reaction between methanol and oxygen. Methanol has higher energy per unit volume than ion proton, can be easily stored, and is far less prone to explosion. Because of these advantages, there are growing expectations of the DMFC being used as a power supply for automobiles, portable equipment or the like (see, for example, Reference (1) in the following Related Art List).

Related Art List (1) Japanese Patent Application Laid-Open No. 2002-32154.

To utilize a fuel cell system as a power supply in a mobile device, it is further required that such a fuel cell system be made smaller in size and lighter in weight. The inventors of the present invention have thus contemplated from various angles technologies that can improve fuel cell systems by making them smaller and lighter.

SUMMARY OF THE INVENTION

An object of the present invention is to provide a technology for making a fuel cell apparatus smaller in size or lighter in weight.

This and other objects and advantages are achieved by a fuel cell apparatus, which runs on liquid fuel, according to the present invention. The fuel cell apparatus according to the present invention includes: a first inlet manifold which is a way to supply gas including oxygen to the anode of the fuel cell apparatus, a second inlet manifold which is a way to supply the liquid fuel to the cathode of the fuel cell apparatus, an outlet manifold which is a way in which fluid discharged from the anode and the cathode flows.

The outlet manifold may functions as a gas liquid separator which separates gas and liquid discharged from the anode and the cathode. The unreacted liquid fuel discharged to the outlet manifold may be supplied to the fuel cell apparatus again. A fuel cell apparatus may include a fuel tank which stores the liquid fuel, in the fuel cell apparatus, the liquid fuel is supplied from the fuel tank to the outlet manifold, and is mixed with liquid discharged from the fuel cell apparatus in the outlet manifold, in the fuel cell apparatus, the liquid mixed the liquid fuel with the liquid discharged from the fuel cell apparatus may be supplied to the fuel cell apparatus.

It is to be noted that any arbitrary combination of the above-described structural components and expressions changed between a method, an apparatus, a system and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

FIGS. 6A and 6B illustrate how a fuel tank is connected to a fuel cell system according to the first embodiment of the present invention.

FIGS. 17A and 17B illustrate how a fuel tank is connected to a fuel cell system according to the second embodiment of the present invention.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

Structure of a Fuel Cell System

Figure 1:
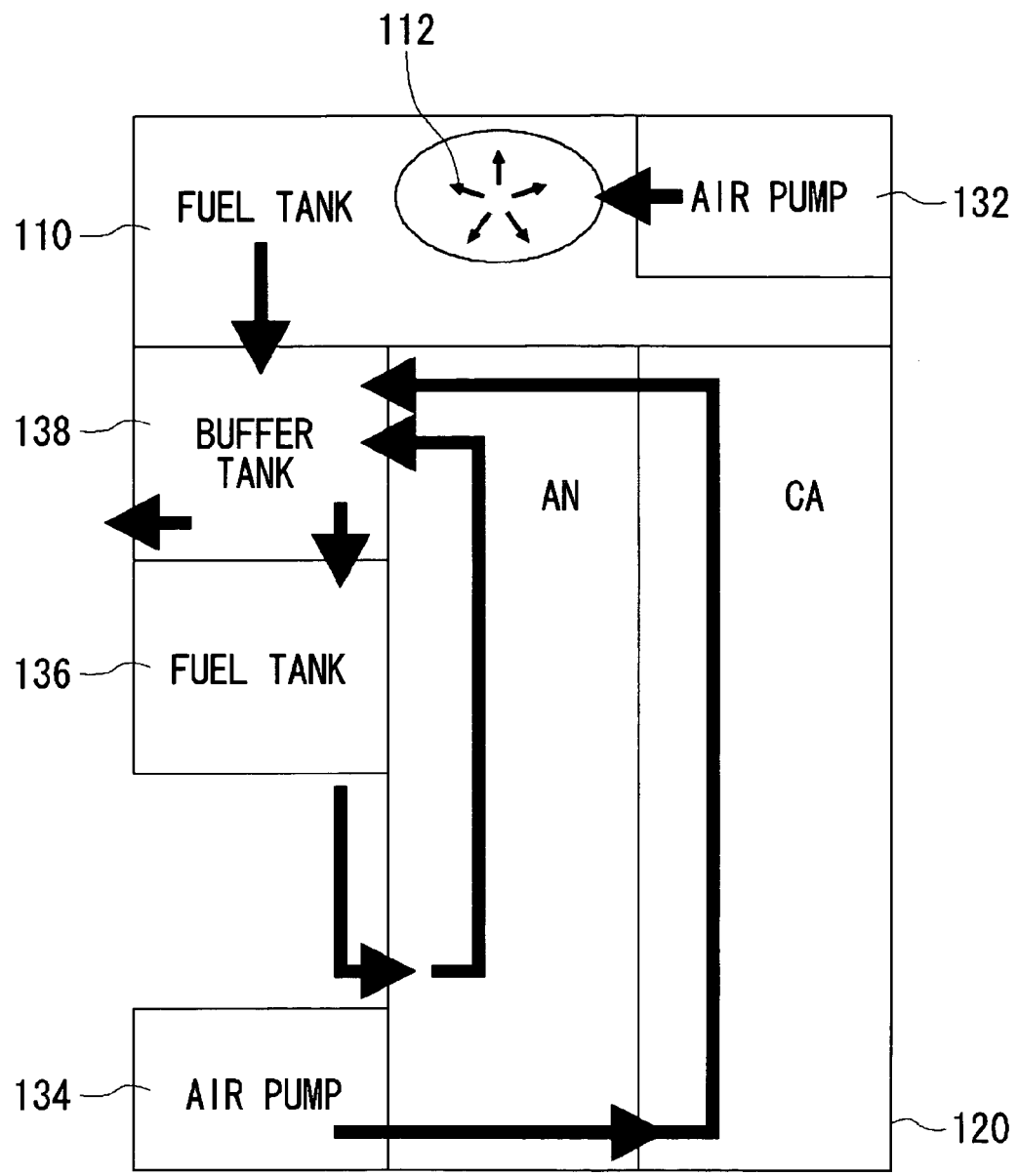
FIG. 1 schematically shows a general structure of a fuel cell system according to the present invention.

FIG. 1 schematically shows a general structure of a fuel cell system 100. FIG. 1 is a schematic representation for explaining an operation of the fuel cell system 100 according to the present invention and does not illustrate a detailed structure thereof. The fuel cell system 100 includes: a fuel tank 110 which is one example of fuel supply means for supplying liquid fuel to a fuel cell apparatus 120; a fuel cell apparatus 120 which operates on the liquid fuel; an air pump 132 which sends air to an air chamber 112 in the fuel tank 110; a buffer tank 138 which holds the liquid fuel in the fuel tank 110 in a diluted state; a fuel pump 136 which sends the low-concentration liquid fuel held in the buffer tank 138 to the fuel cell apparatus 120; and an air pump 134 which sends air to the fuel cell apparatus 120.

A fuel cell apparatus 120 includes a stack of a plurality of multilayered cells, each of which includes a membrane electrode assembly (hereinafter referred to as "MEA"), comprised of a pair of electrode layers and a solid polymer electrolyte membrane having ion proton ion conductivity, such as Nafion (registered trademark) interposed therebetween, and a pair of electrically conductive separators so disposed as to sandwich the MEA and having passages engraved therein to allow the flow of a fluid such as gas or liquid fuel. It is to be noted that a diffusion layer for diffusing the gas or liquid fuel evenly over the membrane may be provided between the MEA and the separators. In a fuel cell apparatus 120 according to the present invention, a liquid fuel, such as an alcohol group (e.g., methanol or ethanol) or ether group, is directly supplied to a negative electrode (fuel electrode) without being reformed, and air containing oxygen is supplied to an positive electrode (air electrode).

During an operation of the fuel cell system 100, air is sent into the air chamber 112 in the fuel tank 110 by the air pump 132, and as the air chamber 112 is expanded, the liquid fuel is pushed out and supplied to the buffer tank 138. In the buffer tank 138, a high-concentration liquid fuel fed from the fuel tank 110 is mixed with an unreacted low-concentration liquid fuel discharged from the fuel cell apparatus 120 and water produced in the fuel cell apparatus 120, and the resulting liquid fuel is stored in a diluted state. The diluted liquid fuel is supplied to a fuel electrode of the fuel cell apparatus 120 by the operation of the fuel pump 136. Air is supplied to an air electrode of the fuel cell apparatus 120 by the operation of the air pump 134. In the fuel cell apparatus 120, carbon dioxide and ion proton ion are generated from reaction between the liquid fuel and water at the fuel electrode, and water is generated from reaction between oxygen in the air and ion proton ion at the air electrode. The carbon dioxide and water resulting from the reactions and the unreacted liquid fuel and air are then sent into the buffer tank 138. As will be described later, the buffer tank 138 functions also as a gas-liquid separating tank, so that the carbon dioxide and air are separated in the buffer tank 138 and discharged outside the fuel cell system.

Figure 2A:
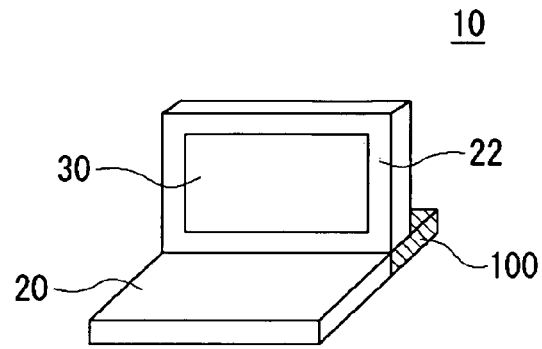
FIGS. 2A, 2B, 2C and 2D illustrate the appearances of a laptop computer as an example of an electronic device incorporating a fuel cell system according to a first embodiment of the present invention.
Figure 2B:
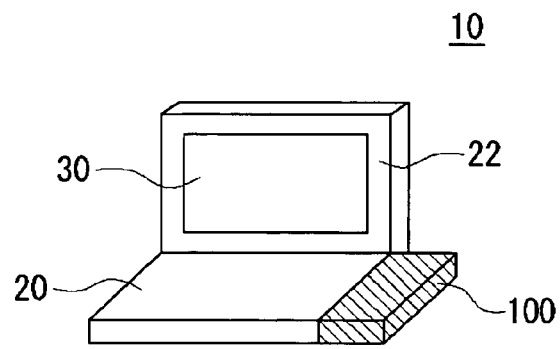
Figure 2C:
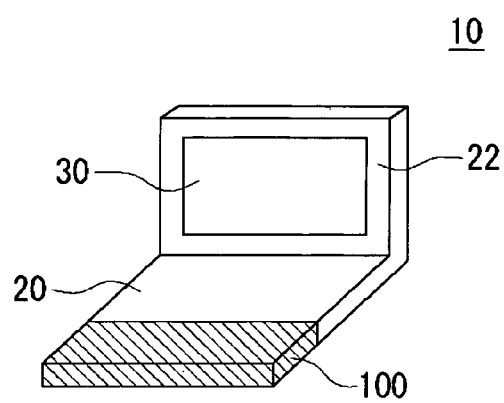
Figure 2D:
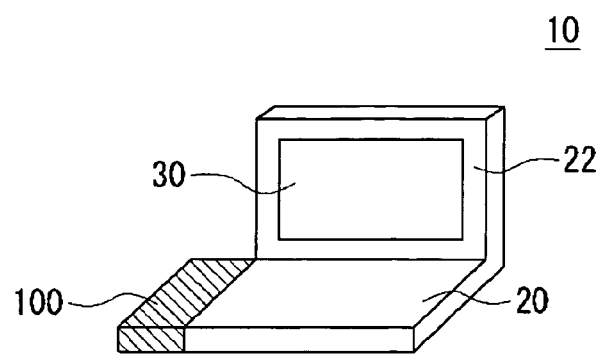

A fuel cell system 100 according to the present invention assumes the utilization thereof as a power supply for a personal computer 10 or other portable-type electronic devices. Accordingly, the component parts are disposed closer together to reduce the amount of piping, and the number of auxiliary components, such as a heat exchanger or a gas-liquid separating tank, which are integral parts of a conventional fuel cell system, is minimized. Hence, the fuel cell system 100 according to the present invention is smaller in size and lighter in weight than the conventional systems First Embodiment Dimensions of a Fuel Cell System FIGS. 2A, 2B, 2C and 2D illustrate the appearances of a laptop computer 10 as an example of an electronic device incorporating a fuel cell system 100 according to a first embodiment. The personal computer 10 is of such structure that a lid member 22, which has a display unit 30 or a like component built therein, is supported by and attached to a body 20 via a shaft in such a manner that it can be opened and closed. For use, the lid member 22 is raised from front to an upright position, so that the display unit 30 provided therewithin can be seen by the user. The fuel cell system 100 is connected to the body 20 of the personal computer 10 and functions as a power supply unit to supply electric power to the personal computer 10. FIG. 2A shows an example of a fuel cell system 100 connected to the rear of the body 20 of the personal computer 10. FIGS. 2B, 2C and 2D show examples of a fuel cell system 100 connected to the right-hand side, the front side and the left-hand side, respectively, of the body 20 of the personal computer 10. As is illustrated in FIGS. 2A, 2B, 2C and 2D, the fuel cell system 100 may preferably be designed to match the shape of the body 20 of the laptop computer 10. That is, the length of the fuel cell system 100 may be chosen to approximate the length of the side of the body 20 to which it is to be connected. Also, the thickness of the fuel cell system 100 may be about the same as that of the body 20.

External Form of a Fuel Cell System

Figure 3:
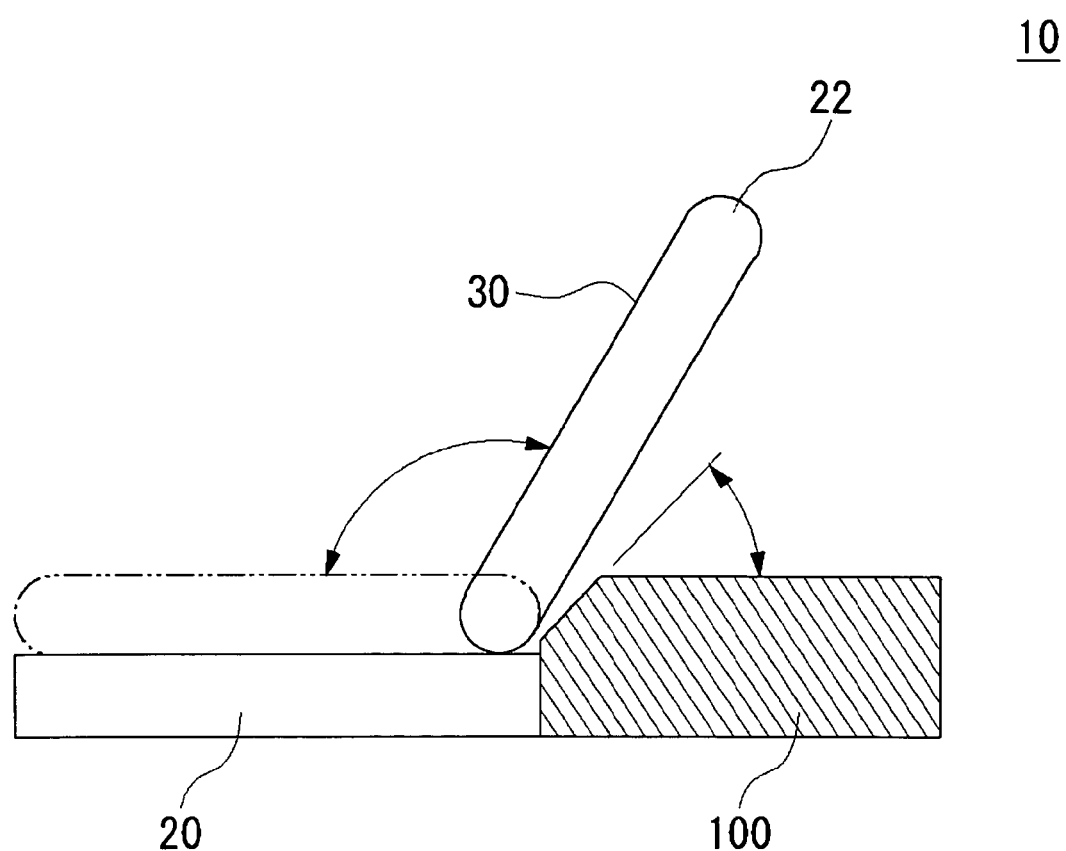
FIG. 3 illustrates a state in which a fuel cell system according to the first embodiment of the present invention is connected to the rear of a laptop computer.

FIG. 3 illustrates a state in which a fuel cell system 100 according to the first embodiment is connected to the back surface of a laptop computer 10. If the thickness of the fuel cell system 100 is greater than that of the body 20, the angle for opening the lid member 22 will be restricted when the lid member 22 of the personal computer 10 is to be opened in the event that the personal computer 10 is used by a user. This may worsen the user's visibility of the display unit 30. Thus a bevel is formed on the upper edge of a connection surface with which the fuel cell system 100 comes in contact with the personal computer 10, so that the opening of the lid member 22 will not be restricted. As a result, the lid member 22 can be opened sufficiently to adjust the angle of the display unit 30, thus improving the visibility of the display unit 30.

Layout of Units in a Fuel Cell System

Figure 4:
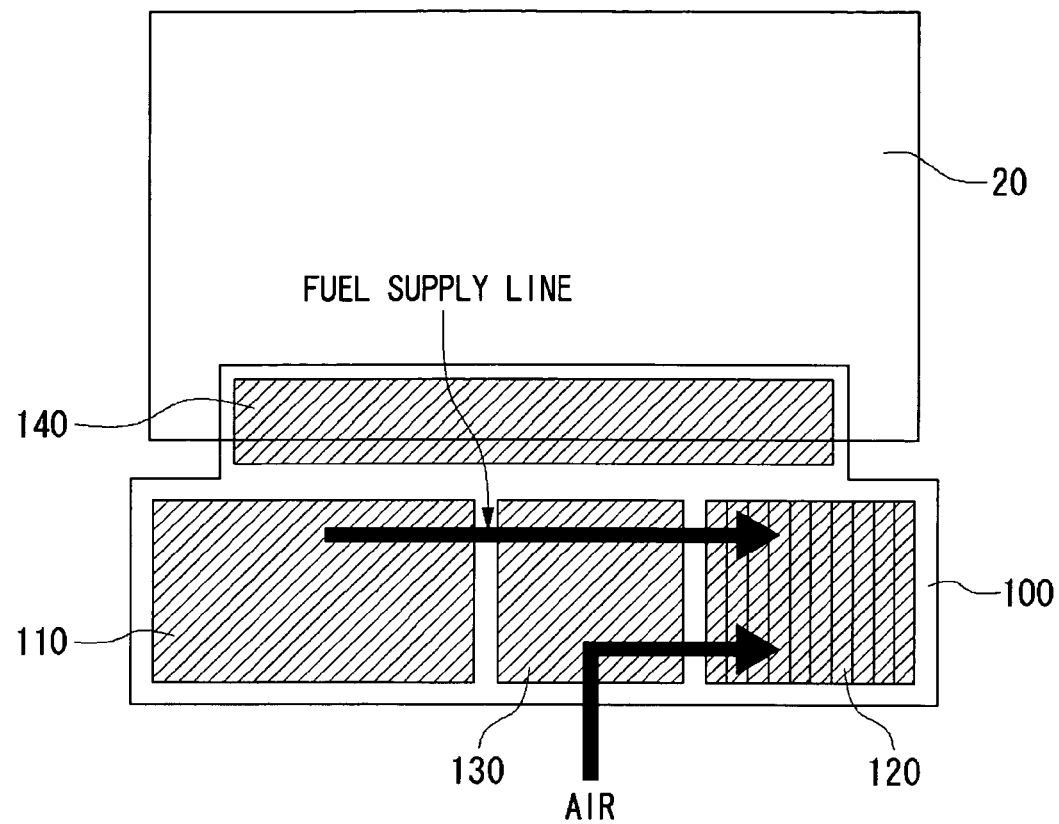
FIG. 4 schematically illustrates a layout of constituent units in a fuel cell system according to the first embodiment of the present invention.

FIG. 4 schematically illustrates a layout of constituent units in a fuel cell system 100 according to the first embodiment. In the fuel cell system 100, a fuel tank 110, an auxiliary unit 130 which includes air pumps 132 and 134, a fuel pump 136 and so forth, and a fuel cell apparatus 120, in this order, are disposed in parallel with the contact side of a body 20 of a personal computer 10. The auxiliary unit 130 with its function of supplying liquid fuel and air to the fuel cell apparatus 120 is in a single unit and placed between the fuel tank 110 and the fuel cell apparatus 120, and this arrangement contributes to space saving and realization of a smaller and lighter product. The liquid fuel is supplied from the fuel tank 110 to the fuel cell apparatus 120 via the auxiliary unit 130, and the fuel cell apparatus 120 disposed such that the direction of the stack therein is the same as that of the fuel supply line (shown by an arrow in FIG. 4) can simplify the structure of the piping and manifold. A control unit 140, which controls the fuel cell system 100 in a unified manner, is provided along the contact side of the body 20 of the personal computer 10. This arrangement can not only simplify the wiring for communication with the personal computer 10 as well as the wiring for connecting the fuel tank 110, the auxiliary unit 130 and the fuel cell apparatus 120 but can also assure separation of the control unit 140 from the fuel supply line, thus suppressing the entry of steam into the control unit 140.

Figure 5:
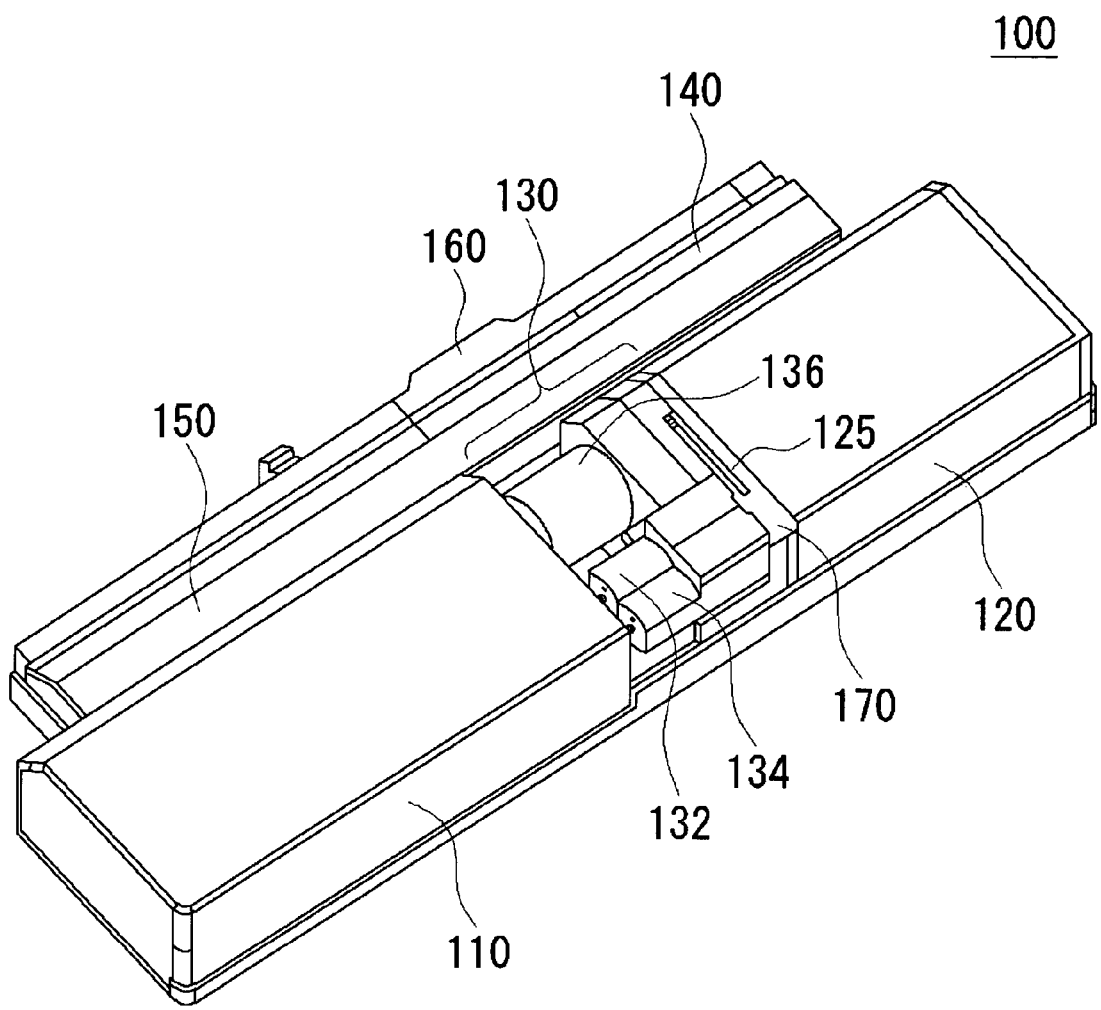
FIG. 5 illustrates an appearance of a fuel cell system according to the first embodiment of the present invention.

FIG. 5 illustrates an appearance of a fuel cell system 100 according to the first embodiment. As described above, in the fuel cell system 100, a fuel tank 110, an auxiliary unit 130 and a fuel cell apparatus 120, in this order, are disposed in parallel with the contact side of a body 20 of a personal computer 10. The auxiliary unit 130 includes air pumps 132 and 134, a fuel pump 136 and a piping unit 170. The piping unit 170, as will be described in detail later, is a plate-like unit which has passages for liquid fuel and air formed therewithin. According to the present embodiment, the piping unit 170 functions also as an end plate that gives a predetermined surface pressure to the stack inside a fuel cell apparatus 120. In other words, the end plate has piping for liquid fuel, air and the like formed inside, and the end plate is disposed adjacent to the auxiliary components. This arrangement can simplify the structure of the fuel cell system 100, thus making it smaller and lighter. Provided above the piping unit 170 is an exhaust opening 125, which ejects outside the gasses, such as air or carbon dioxide, discharged from the fuel cell system 100.

In the fuel cell system 100, a control unit 140 is provided which is to be connected to the personal computer 10. The control unit 140 includes a control circuit, which controls the fuel cell system 100, a conversion circuit, which converts the electric power generated by the fuel cell apparatus 120 into a form of power usable by the personal computer 10, an auxiliary power supply 150 and so forth. The electric power generated by the fuel cell apparatus 120 is converted into a proper voltage by the conversion circuit and is supplied to the personal computer 10 via a PC connector 160. Part of the electric power generated by the fuel cell apparatus 120 is supplied also to the auxiliary power supply 150 and is utilized to recharge it. The auxiliary power supply 150 supplies power to the pumps, motors and so forth of the auxiliary unit 130.

External Forms of a Fuel Tank

FIGS. 6A and 6B illustrate how a fuel tank 110 is connected to a fuel cell system 100 according to the first embodiment. FIG. 6A shows the left-hand side of a fuel cell system 100 shown in FIG. 5, whereas FIG. 6B shows the top view thereof. As is illustrated in FIG. 6A, the fuel cell system 100 is provided with rails 118a and 118b, which slidably support the fuel tank 110. The fuel tank 110 can be connected to the fuel cell system 100 by engaging the grooves 119a and 119b provided in the fuel tank 110 with the rails 118a and 118b, sliding the fuel tank 110 in the direction parallel to the aforementioned fuel supply line and pushing a cap 116 of the fuel tank 110 on the connector 114 provided on the fuel cell system 100. The fuel tank 110 can be disconnected from the fuel cell system 100 by sliding the fuel tank 110 in the direction opposite to that for connection. In this embodiment, the grooves 119a and 119b to engage with the rails 118a and 118b are provided on the side and bottom of the fuel tank 110, which provides excellent stability by preventing the fuel tank 110 from being dislocated or falling out. Moreover, the fuel tank 110 may be attached to or removed from the fuel cell system 100 which is connected to a personal computer 10 or a similar device.

The sides of the fuel tank 110 other than the sides coming in contact with the fuel cell system 100, namely, the three surfaces thereof excluding the side with the groove 119a, the bottom with the groove 119b and the side with the cap 116, themselves constitute the surfaces of a casing of the fuel cell system 100. In other words, the fuel cell system 100 is not provided with casing surfaces on the parts connecting to the fuel tank 110, and therefore, when the fuel tank 110 is connected thereto, the sides of the fuel tank 110 serve as the casing surfaces thereof. This arrangement not only makes the fuel cell system smaller and lighter but also makes the connection and disconnection of the fuel tank 110 easier. A transparent or semitransparent top or side may be employed for the fuel tank 110 so as to facilitate visual checks on the remaining amount of liquid fuel therein. Preferably, at least the inner surfaces of the fuel tank 110 that come in contact with liquid fuel are made of material, such as resin, which is resistant to the liquid fuel.

Connector of a Fuel Tank

Figure 7A:
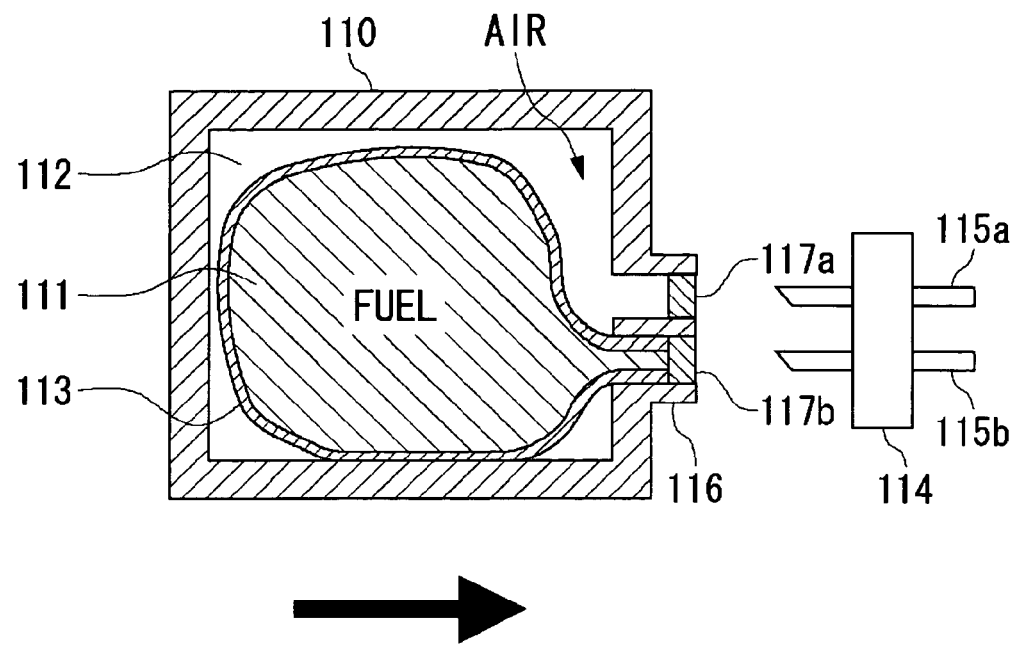
FIGS. 7A and 7B illustrate how a connector is connected to a cap of a fuel tank according to the first embodiment of the present invention.
Figure 7B:
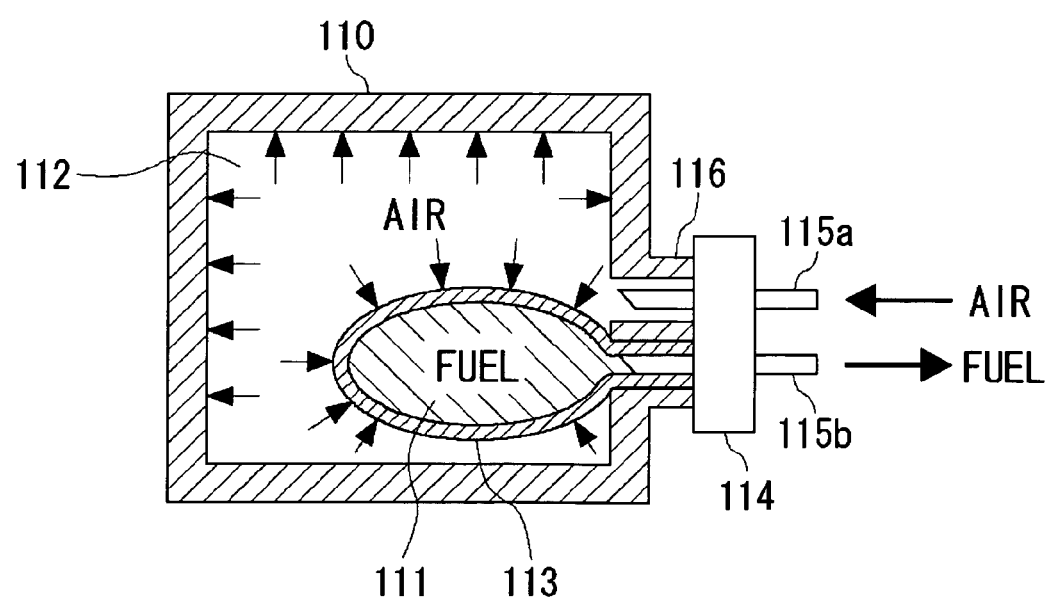

FIGS. 7A and 7B illustrate how a connector 114 is connected to a cap 116 of a fuel tank 110. As shown in FIG. 7A, the connector 114 is provided with an air needle 115a and a fuel needle 115b while the cap 116 of the fuel tank 110 is provided with an air connection outlet 117a and a fuel connection outlet 117b. The air connection outlet 117a and the fuel connection outlet 117b are both provided with a seal member made of such material as silicone rubber or Teflon (registered trademark). And when the fuel tank 110 is connected to the fuel cell system 100, the air needle 115a is, as shown in FIG. 7B, stuck through the seal member into the air connection outlet 117a of the cap 116, and the fuel needle 115b through the seal member into the fuel connection outlet 117b of the cap 116, thus making the passage of air and liquid fuel possible. The seal members are pliable so as to allow easy penetration of the needles and are also elastic and tacky so that when the needles are pulled out, the holes made by them close up to prevent the leakage of air or liquid fuel.

Structure Inside a Fuel Tank

Inside a fuel tank 110 there is provided a bag 113 made of a material resistant to the liquid fuel. And the inside of a fuel tank 110 is partitioned into a fuel chamber 111, holding the high-concentration liquid fuel, and an air chamber 112, filled with air. To supply the liquid fuel, air is sent into the air chamber 112 by the operation of an air pump 132 to increase the volume of the air chamber 112, which will in turn compress the bag 113 and push the liquid fuel out of the fuel chamber 111. This arrangement ensures that the liquid fuel can be supplied the same way in whichever orientation the fuel tank 110 is placed. The bag 113 may be replaced by a piston structure in which liquid fuel and air are separated from each other by a plate member slidably disposed therein.

Internal Structure of a Fuel Cell Apparatus

Figure 8:
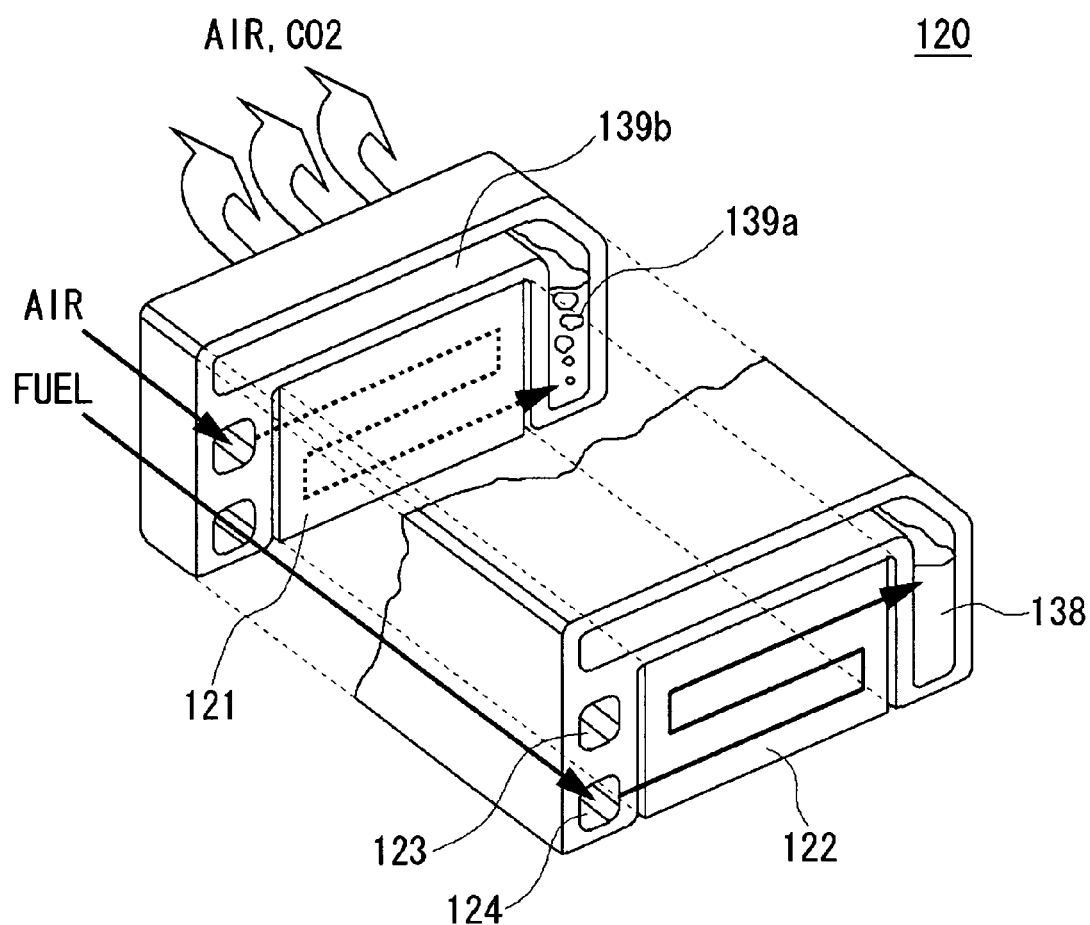
FIG. 8 schematically illustrates a part of the internal structure of a fuel cell apparatus according to the first embodiment of the present invention.

FIG. 8 schematically illustrates a part of the internal structure of a fuel cell apparatus 120. The fuel cell apparatus 120 includes a stack and a member part which is comprised of an air inlet manifold 123, a fuel inlet manifold 124 and a buffer tank 138 combining an air outlet manifold and a fuel outlet manifold. Air is supplied from the air inlet manifold 123 formed in parallel with the fuel supply line, passes through a passage in an air electrode side separator 121, and is discharged into the buffer tank 138. Liquid fuel is supplied from the fuel inlet manifold 124 formed in parallel with the fuel supply line, passes through a passage in a fuel electrode side separator 122, and is discharged into the buffer tank 138. The buffer tank 138 serves also as a gas-liquid separating tank, so that, as will be explained later in FIG. 13, gases, such as air or carbon dioxide, separated from the liquid in a side part 139a of an L-shaped buffer tank 138, are discharged outside from a top part 139b through an auxiliary unit 130.

Furthermore, the buffer tank 138 also has a function of diluting a high-concentration liquid fuel held in the fuel tank 110, thus adjusting the concentration to a level appropriate for the operation of the fuel cell apparatus 120. As will be explained with reference to FIG. 11, a high-concentration liquid fuel supplied to the top part 139b of the buffer tank 138 is diluted in the side part 139a as it is mixed with the water and unreacted low-concentration liquid fuel discharged from the fuel cell apparatus 120. A sensor may be provided which detects the concentration of liquid fuel in the buffer tank 138, and the control unit 140 may adjust the amount of high-concentration liquid fuel to be supplied from the fuel tank 110 to the buffer tank 138, based on the level of concentration detected by the sensor.

Structure of an Auxiliary Unit

Figure 9:
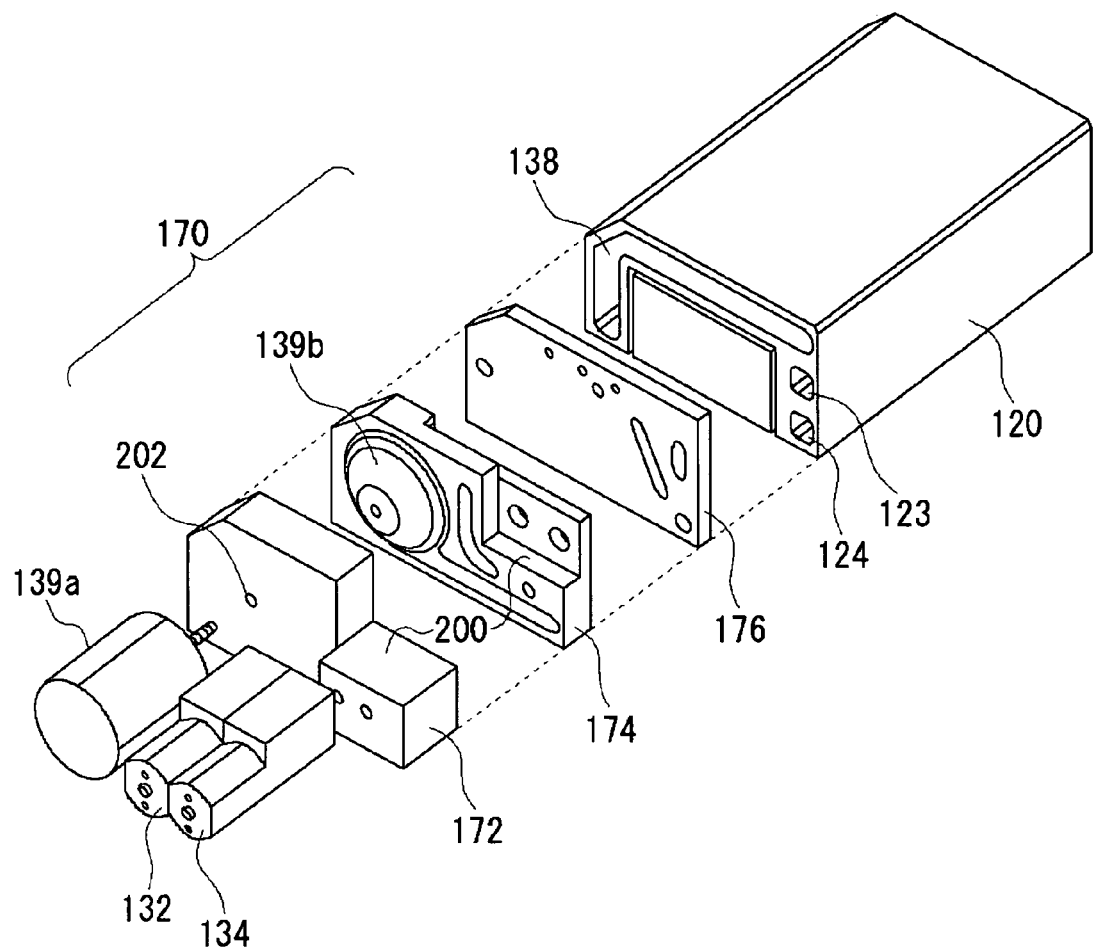
FIG. 9 illustrates a structure of an auxiliary unit according to the first embodiment of the present invention.

FIG. 9 illustrates a structure of an auxiliary unit 130. A piping unit 170 of the auxiliary unit 130 includes three plate-like members, namely, a first member 172, a second member 174 and a third member 176, which are each provided with piping formed therewithin to supply liquid fuel and air to the fuel cell apparatus 120. Air pumps 132 and 134 are disposed in a pump installing position 200 provided in the first member 172 and the second member 174. A spindle of a motor 136a for driving a fuel pump 136 is coupled to a fan 136b via a through-hole 202 provided in the first member 172, and the liquid fuel is circulated as the motor 136a drives the fan 136b. Direct coupling of these pumps to the fuel cell apparatus 120 can not only simplify the structure of the system but can also realize a stable fuel cell system that is less affected by the variation of temperatures. The plate-like unit 170 may be formed of a resin or like material and may be fabricated by injection molding. This leads to a reduced cost of manufacture of parts involved. Also, the piping system turned into a unit permits compact packaging and resulting ease of assembly.

Figure 10:
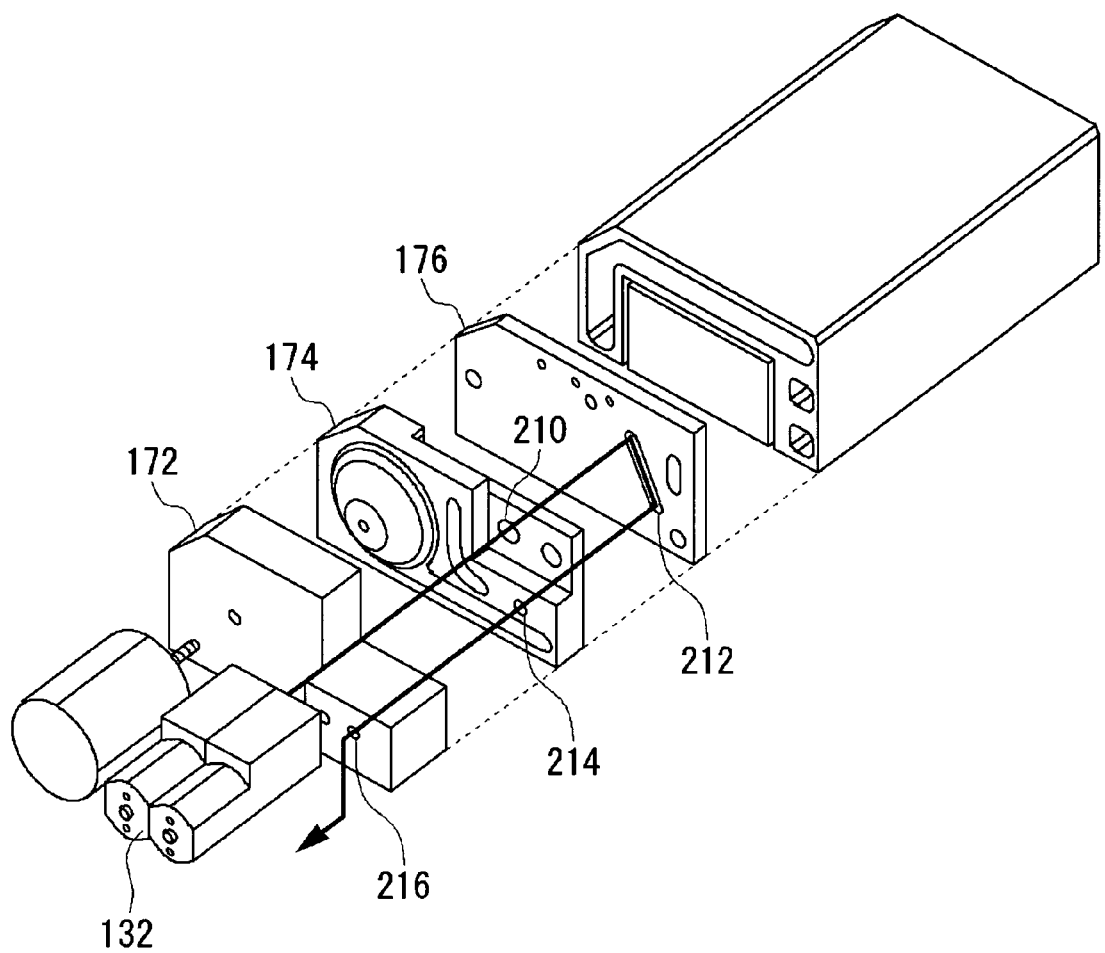
FIG. 10 illustrates how air is sent into an air chamber of a fuel tank from an air pump of an auxiliary unit, according to the first embodiment of the present invention.

FIG. 10 illustrates how air is sent into an air chamber 112 of a fuel tank 110 from an air pump 132. Air is sent from the air pump 132, passes through the piping 210 of a second member, the piping 212 of a third member, the piping 214 of the second member and the piping 216 of a first member, and is supplied into the air chamber 112 through an air connection opening 117a of the fuel tank 110.

Figure 11:
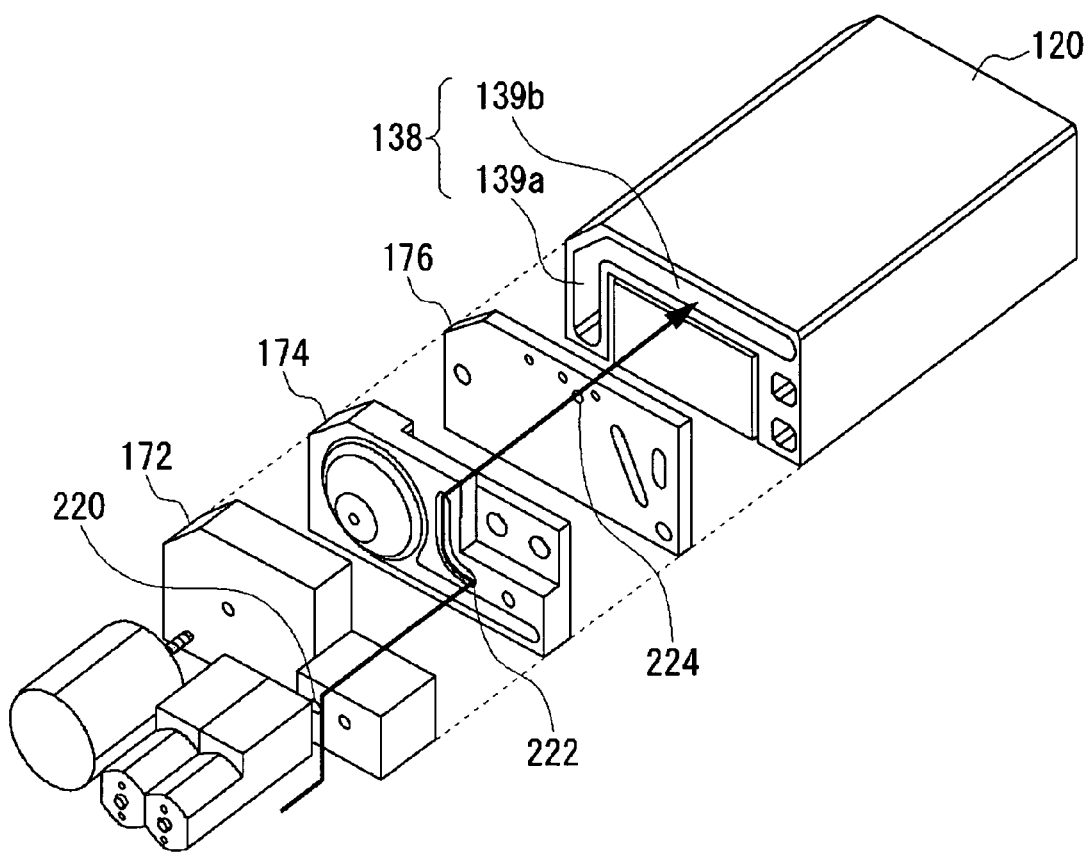
FIG. 11 illustrates how a high-concentration liquid fuel is supplied from a fuel tank to a buffer tank, according to the first embodiment of the present invention.

FIG. 11 illustrates how a high-concentration liquid fuel is supplied from a fuel tank 110 to a buffer tank 138. The liquid fuel is sent out from a fuel connection opening 117b of the fuel tank 110 through a fuel needle 115b, passes through the piping 220 of a first member 172, the piping 222 of a second member and the piping 224 of a third member, and is supplied into a top part 139b of the buffer tank 138. Then it is diluted and stored in a side part 139a thereof.

Figure 12:
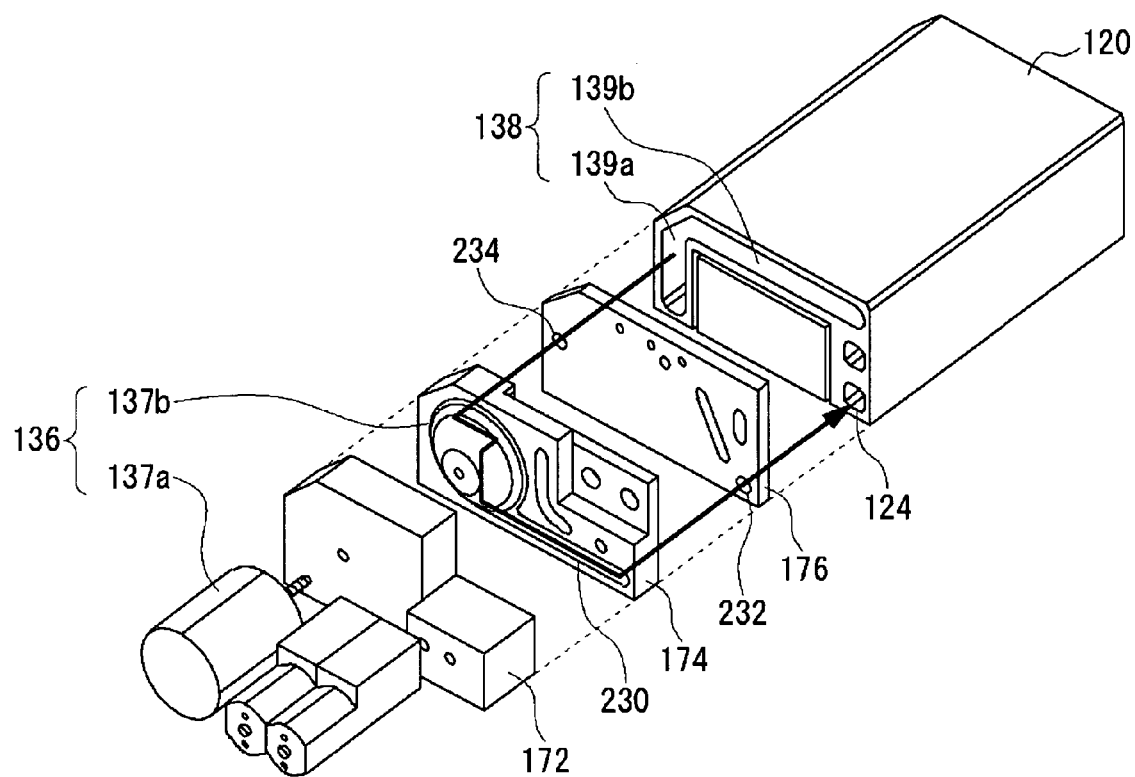
FIG. 12 illustrates how a low-concentration liquid fuel held in a buffer tank is supplied to a fuel electrode of a fuel cell apparatus according to the first embodiment of the present invention.

FIG. 12 illustrates how a low-concentration liquid fuel held in a buffer tank 138 is supplied to a fuel electrode of a fuel cell apparatus 120. The liquid fuel held in the buffer tank 138 is drawn out by a fuel pump 136, passes through the piping 230 of a second member 174 and the piping 232 of a third member 176, and is supplied to a fuel inlet manifold 124 of a fuel cell apparatus 120. The unreacted liquid fuel discharged from and the carbon dioxide generated at the fuel electrode of the fuel cell apparatus 120 are separated into gas and liquid in a side part 139a of the buffer tank 138. As described above, a high-concentration liquid fuel is added to the buffer tank 138 Then the liquid fuel is drawn out again by a fuel pump 136 for circulation.

Figure 13:
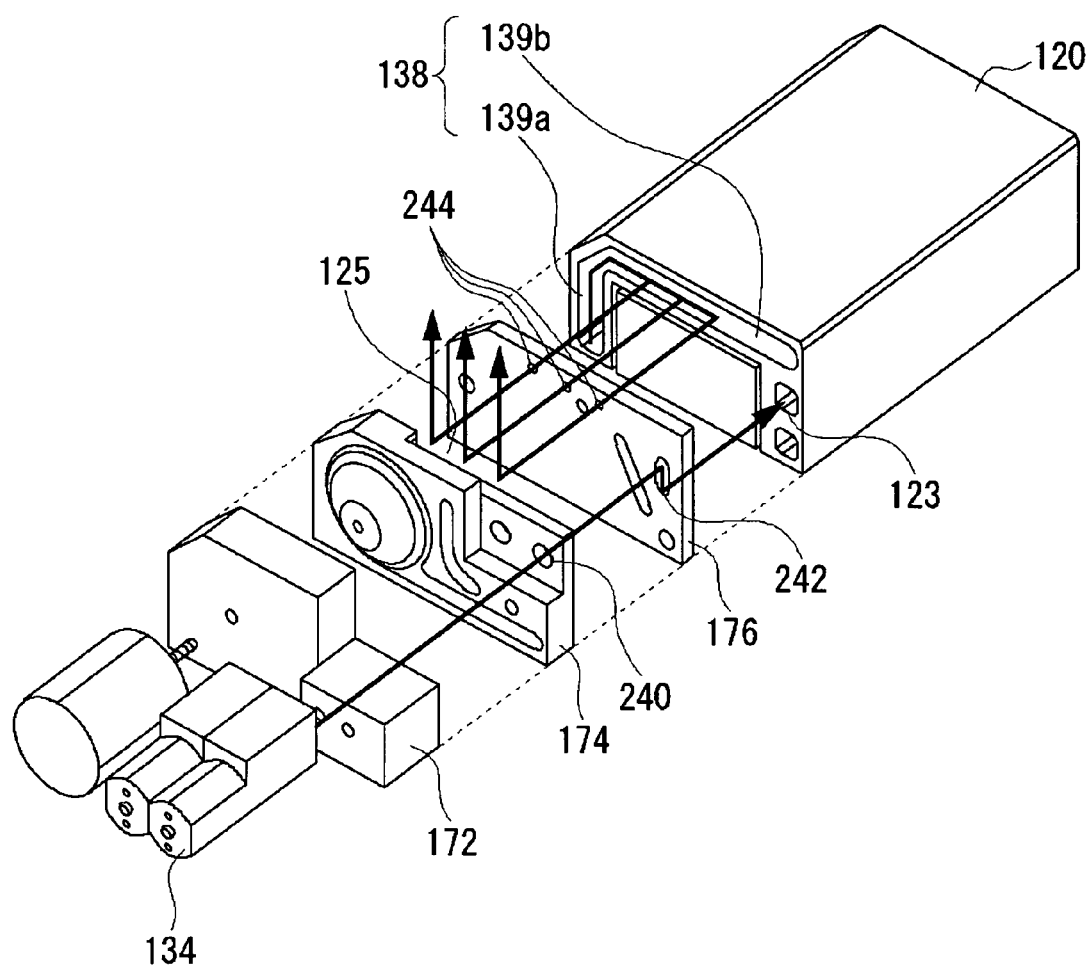
FIG. 13 illustrates how air is supplied to an air electrode of a fuel cell apparatus according to the first embodiment of the present invention.

FIG. 13 illustrates how air is supplied to an air electrode of a fuel cell apparatus 120. Air is sent from an air pump 132, passes through the piping 240 of a second member 174 and the piping 242 of a third member 176, and is supplied to an air inlet manifold 123 of the fuel cell apparatus 120. The unreacted air discharged from and the water generated at the air electrode of the fuel cell apparatus 120 are separated into gas and liquid in a side part 139a of a buffer tank 138. Gases, such as air and carbon dioxide, are discharged outside from a top part 139b of the buffer tank 138 through a piping 244 in the third member and an exhaust opening 125 provided in the second member 174.

Second Embodiment

External Form of a Fuel Cell System

Figure 14:
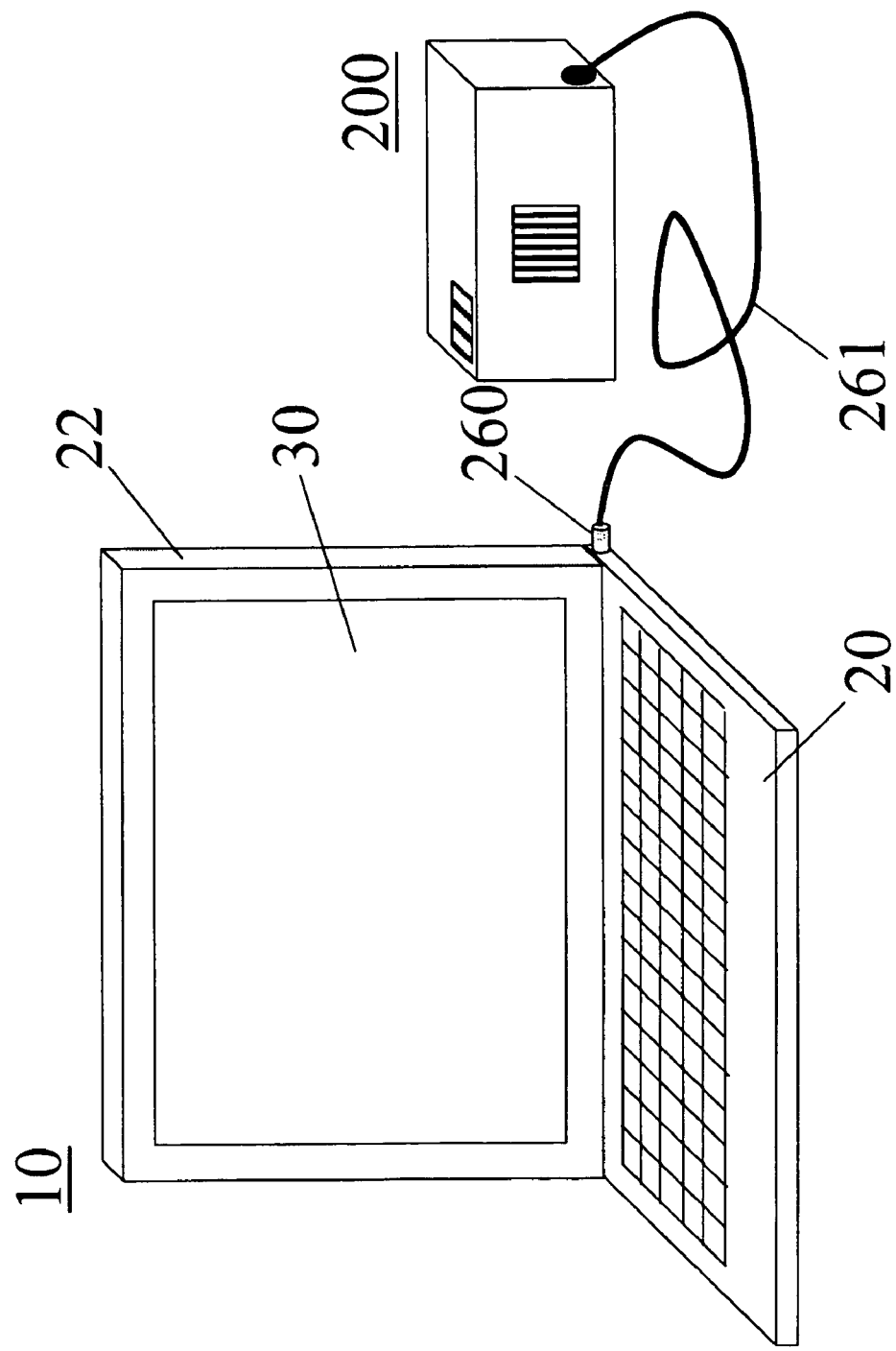
FIG. 14 illustrates an appearance of a laptop computer as an example of an electronic device incorporating a fuel cell system according to a second embodiment of the present invention.

FIG. 14 illustrates an appearance of a laptop computer 10 equipped with a fuel cell system 200 according to a second embodiment. In the following, the repeated explanation of the same features as the first embodiment will be omitted. The fuel cell system 200 according to the second embodiment, connected to a body 20 of a personal computer 10 via a power output connector 260 and a power output cable 261, functions as a power supply unit to supply electric power to the personal computer 10. The fuel cell system 200 according to the second embodiment allows a free choice of distance to an object device to which power is supplied (for example, a personal computer 10) by selecting a power cable 261. That is, it is not necessary to design the external form thereof to match the form of the object device. Accordingly, it can serve as a general-purpose power supply unit through the use of a general-purpose power output connector 260.

Figure 15:
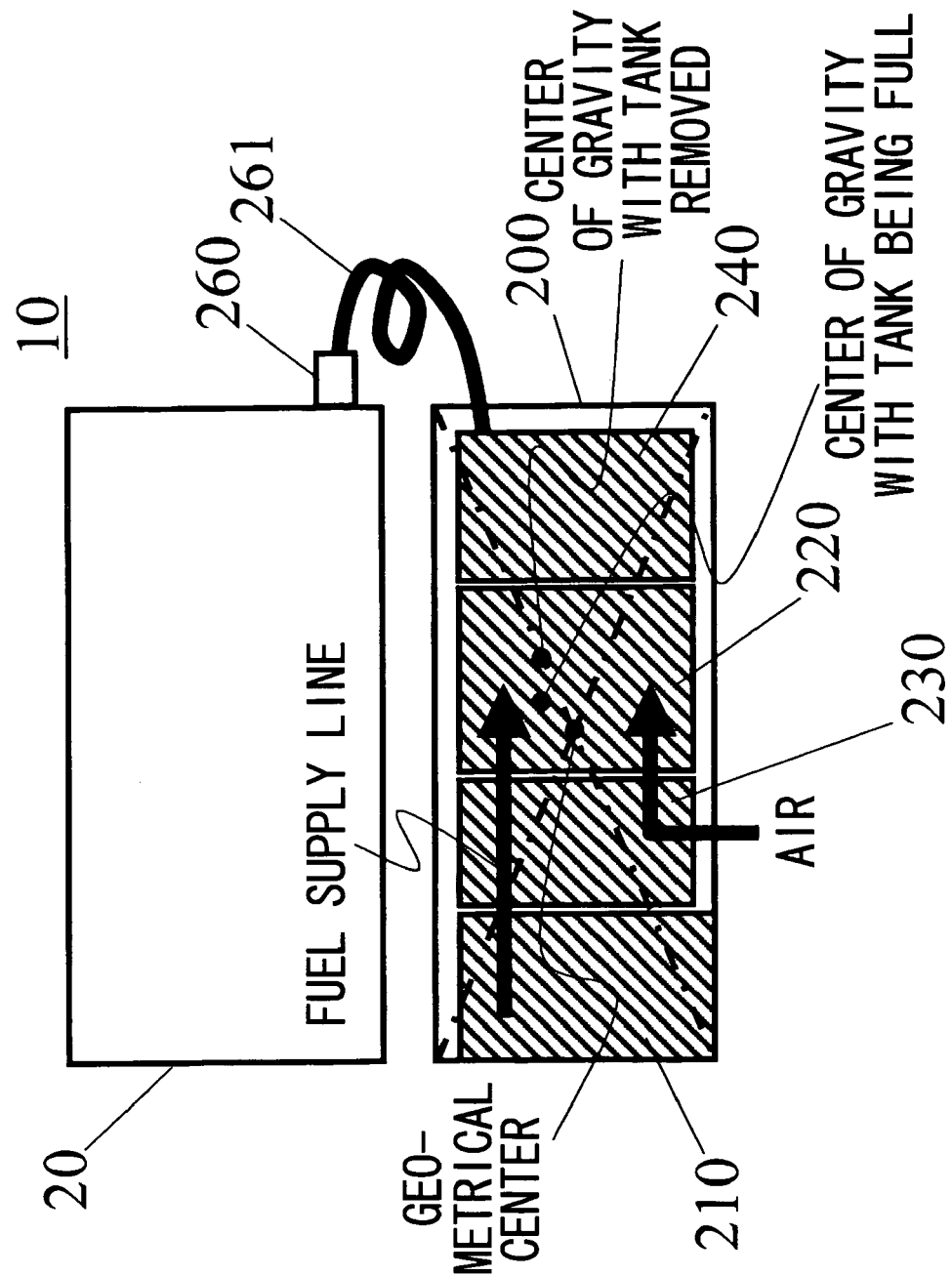
FIG. 15 schematically illustrates a layout of constituent units in a fuel cell system according to the second embodiment of the present invention.

FIG. 15 schematically illustrates layout of each unit in a fuel cell system 200 according to the second embodiment. In the fuel cell system 200, a fuel tank 210, an auxiliary unit 230, which includes an air pump 234, fuel pumps 236 and 237 and the like, and a fuel cell apparatus 220 are disposed in this order. A control unit 240, which controls the fuel cell system 200 in a unified manner, is provided at an end portion of the fuel cell system 200, particularly at an end portion adjacent to the fuel cell apparatus 200. This arrangement can not only shorten the length of the wiring for communication with the personal computer 10 as well as the power wiring with the fuel cell apparatus 220 but can also assure separation of the control unit 240 from the fuel supply line, thus suppressing the entry of moisture or the like into the control unit 240. The fuel cell apparatus 220 is the largest in weight among constituent parts in the fuel cell system 200. Thus, if the fuel cell apparatus 220 is disposed in such a manner that the geometrical center of the fuel cell system 200 lies within the fuel cell apparatus 220, the position of the geometrical center of the fuel cell system 200 becomes close to the position of the center of gravity thereof. As a result of this arrangement, even if the fuel is consumed so as to change the weight of the fuel tank 210, the position of the geometrical center of the fuel cell system 200 can be kept close to the position of the center of gravity thereof. Hence, the physical stability of the fuel cell system 200 is improved.

Figure 16:
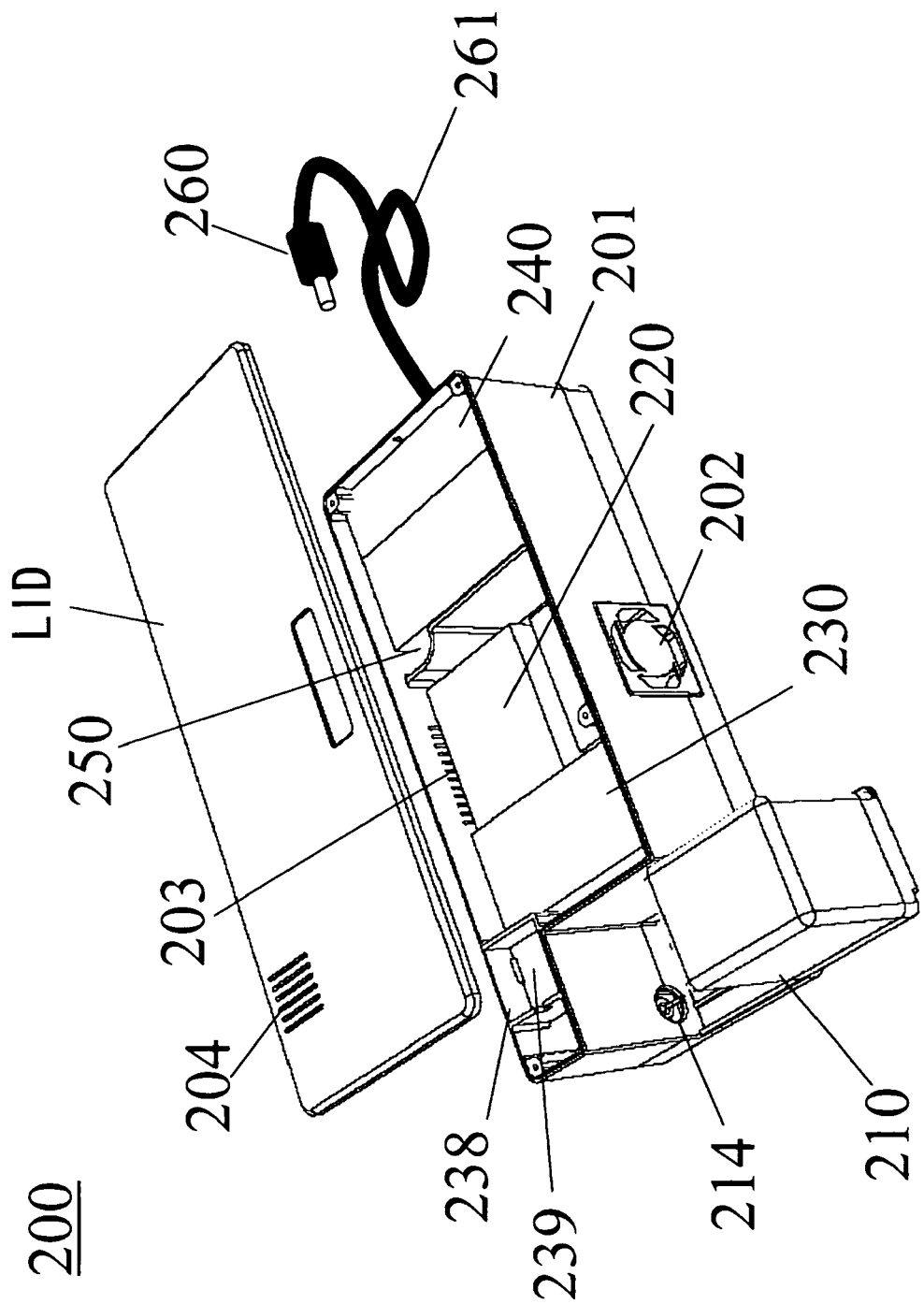
FIG. 16 illustrates an appearance of a fuel cell system according to the second embodiment of the present invention.

FIG. 16 illustrates an appearance of a fuel cell system 200 according to the second embodiment. As described above, in the fuel cell system 200, a fuel tank 210, a buffer tank 238, an auxiliary unit 230 and a fuel cell apparatus 220 are disposed in this order. The auxiliary unit 230 is comprised of an air pump 234, fuel pumps 236 and 237, a piping unit and so forth. The fuel tank 210 and the buffer tank 238 are disposed adjacent to each other in the present embodiment, so that the length of a piping that connects the fuel tank with the buffer tank can be made shorter. This structure can thus prevent the high-concentration methanol solution from being evaporated along passages through a piping and becoming bubbles.

On a side of a casing 201 of the fuel cell system 200 according to the present embodiment there is provided a cooling fan 202 for cooling the fuel cell apparatus 220. And in the position counter to the cooling fan 202 there is disposed a slit 203 for taking in the chilled air where the fuel cell apparatus 220 lies in a position sandwiched by the cooling fan 202 and the slit 203. A slit 204 provided on a top surface of the casing 201 is disposed above the buffer tank 238 and serves as an exhaust opening from which gases, such as air and carbon dioxide, that are discharged from the fuel cell apparatus 220 and separated into gas and liquid in the buffer tank 238 are discharged outside via a filter 239 for selectively transmitting them.

In the fuel cell system 200, a control unit 240 is provided which is to be connected to the personal computer 10. The control unit 240 includes a control circuit, which controls the fuel cell system 200, a conversion circuit, which converts the electric power generated by the fuel cell apparatus 220 into a form of power usable by the personal computer 10, an auxiliary power supply 250 and so forth. The electric power generated by the fuel cell apparatus 220 is converted into a proper voltage by the conversion circuit and is supplied to the personal computer 10 via a power output connector 260 and a power output cable 261. Part of the electric power generated by the fuel cell apparatus 220 is supplied also to the auxiliary power supply 250 and is used to recharge it. The auxiliary power supply 250 supplies power to the pumps and motors of the auxiliary unit 230 at the time of starting the fuel cell system 200. Also, the auxiliary power supply supplies power concurrently with the fuel cell apparatus 220 when the personal computer is subjected to a sudden high-load status.

External Forms of a Fuel Tank

FIGS. 17A and 17B illustrate how a fuel tank 210 is connected to a fuel cell system 200 according to the second embodiment. FIG. 17A shows a top view of the fuel cell system 200 shown in FIG. 16, whereas FIG. 17B shows a front side thereof. As is illustrated in FIG. 17A, the fuel cell system 200 is provided with a rail (projection) 218a and a groove 219b, which slidably support the fuel tank 210. The fuel tank is provided also with a groove 219a and a rail (projection) 218b in positions corresponding to the fuel cell system 200. The fuel tank 210 can be connected to the fuel cell system 200 by engaging the projection 218a and the groove 219a with the groove 219b and the projection 218b provided in the fuel cell system 200 and the fuel tank 210, respectively, and pushing a cap 216 of the fuel tank 110 on a connector 214 provided on the fuel cell system 200. The fuel tank 210 can be disconnected from the fuel cell system 200 by sliding the fuel tank 210 in the direction opposite to that for connection.

In this embodiment, too, the fuel tank 210 may be attached to and removed from the fuel cell system 200 which is connected to a personal computer 10 or a similar device. Two surfaces among the side surfaces of the fuel tank 210 are part of the casing of the fuel cell system 200, so that the size and weight of a fuel cell system can be made smaller and lighter, respectively. Besides, the fuel tank 210 can be easily attached or removed. Moreover, the side surfaces of the fuel tank 210 that constitute the casing 201 of the fuel cell system 200 may be made of transparent or semitransparent material so that the remaining amount of liquid fuel inside is visible from the outside. Preferably, the fuel tank 210 is such that at least the inner surface thereof which comes in contact with the liquid fuel is made of material, such as resin, which is resistant to the liquid fuel.

Connector of a Fuel Tank

Figure 18A:
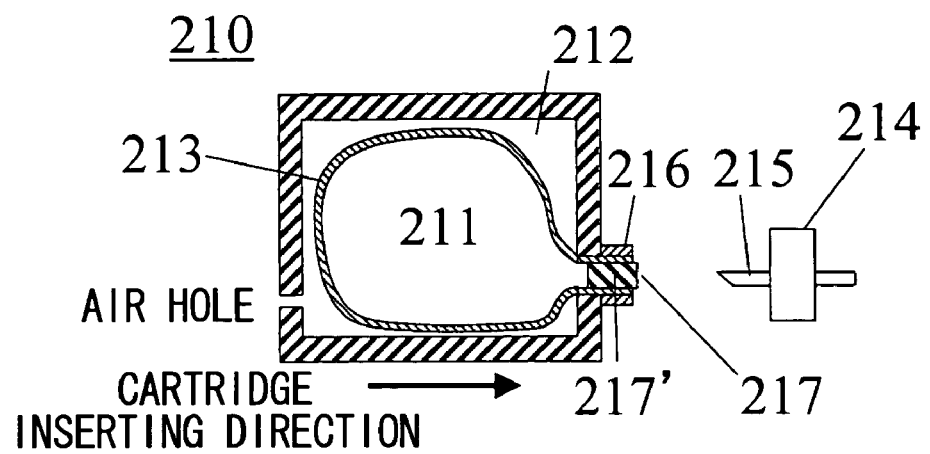
FIGS. 18A and 18B illustrate how a connector is connected to a cap of a fuel tank according to the second embodiment of the present invention.
Figure 18B:
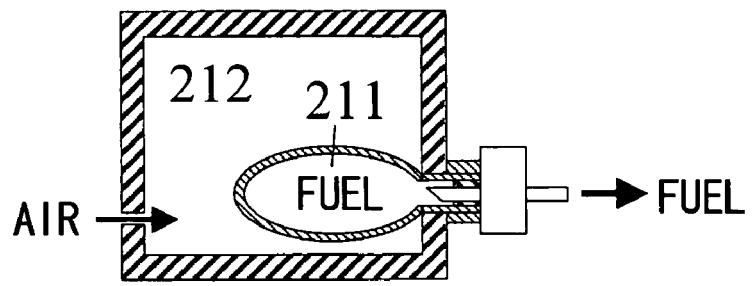

FIGS. 18A and 18B illustrate how a connector 214 is connected to a cap 216 of a fuel tank 210. As shown in FIG. 18A, the connector 214 is provided with a fuel tube 215 while the cap 216 of the fuel tank 210 is provided with a fuel connection outlet 217. The fuel connection outlet 217 is provided with a check valve 217' made of such material as silicone rubber or Teflon (registered trademark). And when the fuel tank 210 is connected to the fuel cell system 200, the fuel tube 215 is, as shown in FIG. 18B, stuck through the check valve 217' into the fuel connection outlet 217 of the cap 216, thus making the passage of liquid fuel possible.

Structure Inside a Fuel Tank

Inside a fuel tank 210 there is provided a bag 213 which is, for example, made of a material having resistance to the liquid fuel and flexibility such as in rubber balloon or flexibility such as in TEDRER (registered trademark) bag. And the inside of a fuel tank 210 is partitioned into a fuel chamber 211, holding the high-concentration liquid fuel, and an air chamber 212, filled with air. To supply the liquid fuel, the liquid fuel is sucked in from the fuel chamber 211 by the fuel pump 237, and the air is sent in from the fuel cell system through an air hole which is provided on a wall surface of the fuel tank 210. This structure ensures that the liquid fuel can be supplied the same way in whichever orientation the fuel tank 210 is placed. The bag 113 may be replaced by a piston structure in which liquid fuel and air are separated from each other by a plate member slidably disposed therein.

The present invention has been described based on the embodiments which are only exemplary. It is understood that there also exist other various modifications to the combination of each component and process described above and that such modifications are encompassed by the scope of the present invention which is defined by the appended claims.

Although the liquid fuel such as methanol solution is used as fuel in the present embodiments, the fuel is not limited thereto and liquid fuel other than methanol or pure ion proton may be used.

Although a fuel cell system where the electric power is supplied to a laptop computer has been described in the present embodiments, a load to which the electric power of the fuel cell system is supplied is not limited thereto and the present embodiments may be utilized for portable equipment such as cellular phones and PDAs and other portable devices such as irons, driers, shavers and electric toothbrushes.

What is claimed is:

1. A fuel cell apparatus for running on liquid fuel, the apparatus including:
   a fuel tank which stores said liquid fuel;
   a stack; and
   a casing, said casing being provided with:
      a first inlet manifold capable of supplying gas including oxygen to the cathode of said fuel cell apparatus,
      a second inlet manifold capable of supplying said liquid fuel to the anode of said fuel cell apparatus,
      an outlet manifold capable of allowing fluid discharged from said anode and fluid discharged from said cathode to flow, wherein said fluid discharged from said anode and said cathode is supplied with the liquid fuel from said fuel tank and with fluid discharged from said stack, wherein
   the outlet manifold is formed as an L-shape and includes a side part capable of storing the liquid fuel and the water or the unreacted liquid, and also includes a top part capable of receiving gas discharged from a gas-liquid separation in the side part, the casing is formed to have a substantially C-shaped cross section formed by the first inlet manifold and the second inlet manifold so as to be opposite to the side part of the outlet manifold, thereby forming a gap from the side part, and the stack is provided in the gap in the casing, between the side part of the outlet manifold and a part comprising the first inlet manifold and the second inlet manifold.

2. The fuel cell apparatus according to claim 1, wherein the stack comprises:

an air electrode side separator in which is formed a passage communicating with the first inlet manifold and the side part of the outlet manifold; and a fuel electrode side separator in which is formed a passage communicating with the second inlet manifold and the outlet manifold.

* * * * *